Oct. 26, 1937.   C. H. HILL   2,097,324

ELECTRICAL CONNECTION

Filed Aug. 25, 1933

Inventor:
Charles H. Hill,
by Harry E. Dunham
His Attorney.

Patented Oct. 26, 1937

2,097,324

UNITED STATES PATENT OFFICE 2,097,324

ELECTRICAL CONNECTION

Charles Hubbard Hill, Drexel Hill, Pa., assignor to General Electric Company, a corporation of New York Application August 25, 1933, Serial No. 686,715

6 Claims. (Cl. 173—263)

My invention relates to electrical connections, more particularly to electrical connections of high current-carrying capacity for joining adjacent ends of alined busbars.

The electrical connections or joints between sections of alined busbars carrying comparatively heavy currents, as in metal clad switchgear for example, wherein metal clad bus and switch units including phase busbar sections are connected together to form a bus and switch station, have heretofore been a source of heating unless a connection or joint having a comparatively large contact area were used. A well known method of connecting adjacent ends of alined busbars consisted of using comparatively large clamping plates, the coacting contact faces of the busbars and plates being machined flat so as to obtain approximately uniform contact engagement when the plates are clamped to the busbars.

This arrangement, however, involves a number of serious disadvantages particularly in the case of metal clad switchgear wherein high current-carrying capacity and a low space factor are very desirable. These disadvantages include a comparatively expensive, long and bulky joint for carrying heavy currents without over-heating, comparatively high contact resistance, and the probability of increasing contact resistance during use.

A principal object of the present invention is the provision of an improved electrical connection of high current-carrying capacity for busbars of the aforesaid character which shall be compact and of comparatively small overall length, simple and inexpensive in construction and assembly, and which shall have a comparatively low and constant resistance.

My invention will be more fully set forth in the following description referring to the accompanying drawing, and the features of novelty which characterize my invention will be pointed out with particularity in the claims annexed to and forming a part of this specification.

Figure 3:
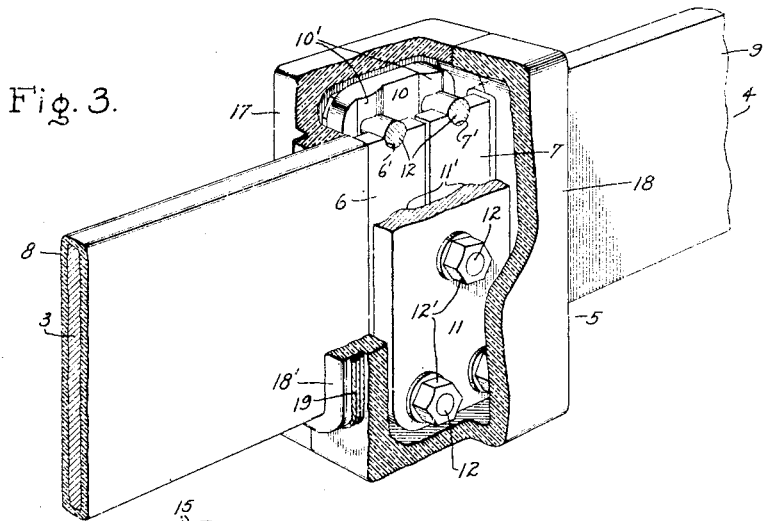
Figure 2:
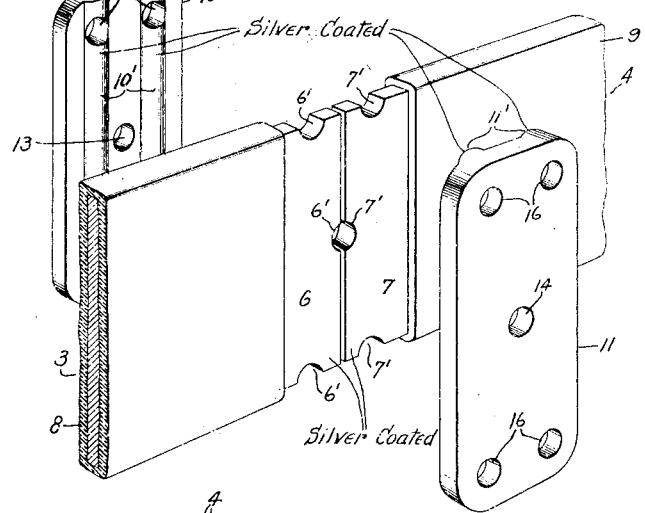
Figure 1:
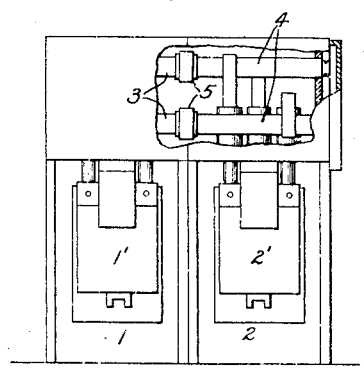

Referring to the drawing, Fig. 1 is an elevational view, partly in section, of two metal clad bus and switch units joined by electrically connecting the busbar sections of each unit to form a bus and switch station; Fig. 2 is an exploded view showing a busbar connection embodying my invention, and Fig. 3 is a perspective view, partly in section, illustrating the busbar connection of Fig. 2 assembled and insulated.

For purposes of illustrating an application of my invention, reference is had to Fig. 1 which shows a pair of metal clad bus and switch units 1 and 2 including phase busbar sections 3 and 4, respectively. The adjacent ends of alined phase busbars 3 and 4 are electrically united by a connection generally indicated at 5. This type of switchgear is well known in the art and further description thereof is believed unnecessary other than to point out that the busbar sections of each unit are connected through a corresponding circuit breaker, indicated respectively at 1' and 2', to an outgoing feeder circuit (not shown).

Referring more particularly to Fig. 2, the alined busbars 3 and 4 each comprises flat strips 6 and 7, respectively, composed of suitable conducting material as copper for example. The busbars in the present instance are positioned end-to-end and are coated with molded insulation 8 and 9, respectively, the insulation terminating near the ends of the busbar, as illustrated, so as to leave the copper bare at the planar contact surfaces for the electrical connection. It will, of course, be apparent that the busbars may remain bare under certain conditions, as where the busbars are immersed in an insulating oil.

For the purpose of electrically interconnecting the adjacent ends of the alined busbars 6 and 7 a pair of clamping plates 10 and 11 are provided and arranged at opposite sides of the busbars so as to bridge the same and make with said busbars a low resistance connection having a comparatively limited contact area.

This is accomplished by coating the contact surfaces with a material such as silver, the oxide of which has comparatively low resistance, and providing for high pressure contact engagement very limited in area. Another contact material which may be used to advantage in place of copper is tin. In the case of copper, the oxide thereof has much greater resistance, the formation of copper oxide between the contact surfaces greatly increasing the resistance of the joint so that excessive heating at this place may result when heavy currents are carried.

In a preferred embodiment of my invention but without limitation thereto a contact plate, and preferably each of said plates, is provided with a raised preferably rounded contact portion or portions so proportioned that the actual contact between said plate and a busbar is concentrated at a comparatively small area.

In the form illustrated each plate is provided with a pair of substantially parallel spaced ridge-like contact portions 10' and 11', respectively, extending transversely of the busbars and arranged so that the busbars at each side thereof are engaged respectively by the ridge-like contact portions of a clamping plate. It will, therefore, be observed that the clamping plates 10 and 11 when engaging the busbars 6 and 7 at opposite sides thereof make substantially line contact between the busbars and the corresponding clamping or bridging plate. It shall also be understood that by "line contact" is meant a very limited contact area, not necessarily continuous, such that normal clamping pressure at the joint produces a comparatively high pressure per unit of contact area.

The plates 10 and 11 are suitably clamped together, preferably detachably as by through-bolts 12 (Fig. 3) and adjusting nuts 12', at opposite sides of the busbars so that high contact pressure is produced between the rounded ridge-like contact portions 10' and 11' and the ends of the busbars 6 and 7. This contact pressure, which is substantially concentrated along a line at opposite sides of each busbar, is very high per unit contact area thereby producing a comparatively low resistance connection.

Furthermore, the line contact engagement which the comparatively narrow clamping plates make with the busbars eliminates the necessity for exact horizontal alinement of the busbars as in the case of the comparatively long and accurately machined connection plates heretofore used. A good joint may be obtained notwithstanding the fact that there is an appreciable misalinement of the busbars and this fact greatly facilitates the work of assembly. This is due to the fact that the raised contact portions serve as pivotal connections between the plates and busbars.

The current-carrying capacity of the connection is further increased and the contact resistance maintained substantially constant by coating the coacting contact surfaces of the busbars and the raised contact portions of the clamping plates as indicated with a suitable conducting material as silver, the oxide of which has substantially the same resistance as the metal itself.

The through-bolts 12, in interconnecting the clamping plates 10 and 11 so as to maintain contact pressure and rigidly to interconnect the busbars, are positioned in notches 6' and 7' located at the opposite edges and ends, respectively, of the busbars 6 and 7. The notches 6' and 7' at the adjoining edges of the busbars form an aperture in alinement with apertures 13 and 14 extending through the central portions of the plates 10 and 11, and the notches at the opposite edges of the busbars are in alinement with apertures 15 and 16 extending through raised contact portions of the plates 10 and 11, respectively. It will, therefore, be noted that when the plates 10 and 11 are clamped to the bushbars, pressure is applied directly along each line contact and also at the center of the plate. By notching the edges of the busbars instead of drilling the same, a greater cross section of copper at the joint is available.

Referring more particularly to Fig. 3, the clamping plates when bolted in position to form the electrical connection may be insulated by a pair of molded insulating members 17 and 18 which are fitted on opposite sides of the busbar joint so as to form with the molded insulating coating of the bushbars a continuous insulating structure. The insulating members 18 are formed as complementary shells, each having a flanged portion as 18' closely fitting around the busbar insulation so that the electrical connection is snugly enclosed by a complete insulating shell, which is compact and neat in appearance. In insulating the joint for high voltages, an insulating compound may be used to fill the space between the connection and insulating shell.

The insulating members are suitably secured together, as by cord 19 wrapped about the flanges 18' and coated with an insulating varnish.

It should be understood that my invention is not limited to specific details of construction and arrangement thereof herein illustrated, and that changes and modifications may occur to one skilled in the art without departing from the spirit of my invention.

What I claim as new and desire to secure by Letters Patent of the United States, is:

1. An electrical connection of high current-carrying capacity for joining adjacent ends of two substantially aligned busbars formed as flat rigid strips including a clamping plate adapted to engage and bridge said busbars at one side thereof, the coacting surfaces of one of said busbars and said plate including a raised restricted contact portion for concentrating the contact engagement at a very small area as compared with the area of said surfaces, the coacting surfaces of the other of said busbars and said plate also including a raised restricted contact portion for concentrating the contact engagement at a very small area as compared with the area of the corresponding surfaces, and clamping means coacting with said plate and busbars for producing without deformation of said busbars high contact pressure per unit of said contact area.

2. An electrical connection of high current-carrying capacity for joining adjacent ends of two substantially aligned rigid busbars having flat sides formed, including a clamping plate adapted to engage and bridge said busbars at one side thereof, the coacting surfaces of one of said busbars and said plate including a raised restricted contact portion for concentrating the contact engagement at a very small area as compared with the area of said surfaces the coacting surfaces of the other of said busbars and said plate also including a raised restricted contact portion for concentrating the contact engagement at a very small area as compared with the area of the corresponding surfaces, said raised contact portions arranged so as to remain in effective contact engagement with the coacting contact surfaces notwithstanding limited misalignment of said busbars, and clamping means adjustable to limited misalignment of said busbars coacting with said plate and busbars for producing without deformation of said busbars high contact pressure per unit of said contact area.

3. An electrical connection of high current-carrying capacity for joining adjacent ends of two substantially alined busbars having planar contact surfaces positioned end-to-end, comprising a plate arranged to bridge said surfaces, said plate having a raised contact portion for engaging a planar surface of one of said bars in substantially line contact, and another raised contact portion similarly engaging a planar surface of the other busbar, said raised contact portions and said planar contact surfaces having a coating of silver, and clamping means for interconnecting said bushbars and plate and for producing high unit contact pressure at the aforesaid line contacts without deformation of said plate and busbars.

4. An electrical connection of high current-carrying capacity for joining adacent ends of two substantially alined busbars having planar contact surfaces positioned end-to-end, comprising a plate arranged to bridge said surfaces of said busbars at one side thereof, said plate having spaced ridge-like contact portions, said portions engaging respectively planar surfaces of said busbars in substantially line contact transversely of said busbars, and clamping means coacting with said busbars and plate for producing high unit contact pressure between said ridge-like contact portions and busbars without deformation of said plate and busbars.

5. An electrical connection of high current-carrying capacity for joining adjacent ends of two alined busbars, each busbar being formed of a flat rigid strip substantially rectangular in cross section, comprising a pair of clamping plates disposed at opposite sides of and bridging said busbars, each of said plates having a pair of substantially parallel ridge-like raised portions arranged so that each busbar at one side of the connection is engaged by one of said ridge-like portions, and means clamping said plates together for producing high contact pressure between said ridge-like portions and busbars without deformation of said busbars.

6. An electrical connection of high current-carrying capacity for joining adjacent ends of two aligned busbars formed as flat rigid strips, comprising a pair of clamping plates disposed at opposite sides of and bridging said busbars, each of said plates having raised restricted contact portions for concentrating the contact engagement of said plates and busbars at a very small area as compared with the area of the juxtapositioned surfaces, said restricted contact portions being arranged so that each plate engages through said portions both of said busbars, and means for clamping said plates to said busbars for producing without deformation of said busbars high contact pressure per unit of said contact area.

CHARLES HUBBARD HILL.